No. 665,872.  
E. BRUEGGEMANN.  
WHEEL HUB.  
(Application filed Oct. 17, 1900.)  
Patented Jan. 15, 1901.
(No Model.)
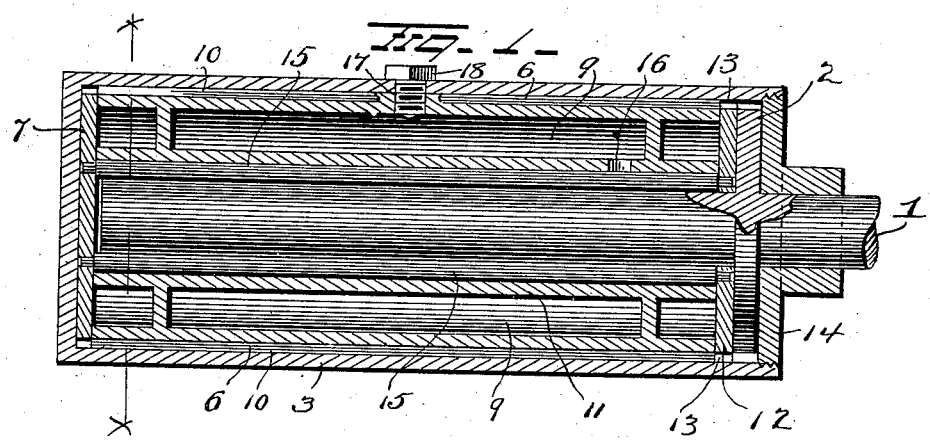
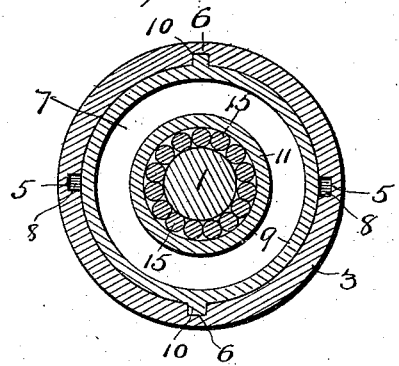
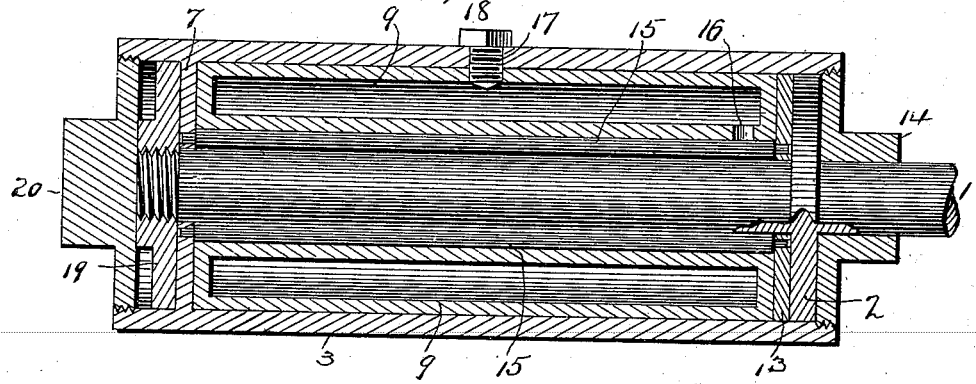
WITNESSES  
INVENTOR  
E. Brueggemann  
By H. A. Seymour  
Attorney

UNITED STATES PATENT OFFICE.

EDMUND BRUEGGEMANN, OF CASTELLO, MISSOURI.

WHEEL-HUB.

SPECIFICATION forming part of Letters Patent No. 665,872, dated January 15, 1901.

Application filed October 17, 1900. Serial No. 33,363. (No model.)

*To all whom it may concern:*

Be it known that I, EDMUND BRUEGGEMANN, a resident of Castello, in the county of St. Louis and State of Missouri, have invented certain new and useful Improvements in Wheel-Hubs; and I do hereby declare the following to be a full, clear, and exact description of the invention, such as will enable others skilled in the art to which it appertains to make and use the same.

My invention relates to an improvement in wheel-hubs, the object of the invention being to provide an improved self-lubricating roller-bearing hub which will be so constructed as to prevent any possibility of the entrance therein of dirt or grit and which will prevent the escape of lubricant therefrom.

With this object in view the invention consists in certain novel features of construction and combinations and arrangements of parts, as will be more fully hereinafter described, and pointed out in the claims.

In the accompanying drawings, Figure 1 is a view in longitudinal section, illustrating my improvements. Fig. 2 is a view in section on the line *x x* of Fig. 1, and Fig. 3 is a view of a modified form of my invention.

1 represents an axle having secured thereon or made integral therewith, near its end, a disk 2, and 3 represents my improved hub or casing closed at its outer end, as shown. The casing 3 is made in its inner face with diametrically opposite longitudinal grooves 5 and 6, respectively, and a disk 7 is located against the inner face of the outer end of casing 3 and made with lugs 8 to fit into grooves 5 and lock the disk 7 and casing together.

A cylindrical lubricant-chamber 9 is mounted in the casing 3 and provided on its outer face with flanges 10 to fit into grooves 6 and lock the casing and lubricant-chamber together, and said chamber is made with a central sleeve 11, of appreciably greater diameter than axle 1, for a purpose which will more fully hereinafter appear.

A disk 12, having a central hole for the reception of axle 1, is located between the inner end of chamber 9 and disk 2 and is provided with lugs 13 to fit into grooves 5 and lock the casing and disk together, and a nut 14 is screwed into the inner end of casing 3 and against disk 2 to secure the hub on the axle.

A series of elongated rollers 15 are disposed about axle 1, between the same and the central sleeve 11 of lubricant-chamber 9, the trunnions at the respective ends of said rollers being mounted in notches or bearings in the disks 7 and 12, and said rollers are adapted to be supplied with lubricant through a duct 16 in sleeve 11, and the lubricant-chamber is made with a hole 17, alining with a hole in casing 3 to permit the chamber to be filled, and said holes are normally closed by a plug 18, as shown. It will thus be seen that disks 7 and 12, carrying rollers 15 and lubricant-chamber 9, are all locked to rotate with casing 3, and hence when the casing is rotated the rollers 15 will be rotated about axle 1 and friction reduced to a minimum, and owing to the complete closure of the inner end of the casing by disk 2 and nut 14 any possibility of the entrance of dirt or grit or the escape of lubricant from the casing is obviated.

Instead of constructing my improvements as above described I might make the same as shown in Fig. 3. In this form of my invention the axle 1 projects through a central hole in disk 7 and is screw-threaded on its end projecting beyond disk 7, and the outer end of the casing is open and internally screw-threaded, and a disk 19 is screwed onto the end of axle 1, and a nut 20 is screwed into the outer end of the casing, thus making the outer end of the hub dust-proof.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A wheel-hub comprising a cylindrical casing, a cylindrical lubricant-chamber removably secured in said casing and having a central sleeve, and rollers mounted to rotate in said sleeve.

2. A wheel-hub comprising a cylindrical casing, a cylindrical lubricant-chamber removably secured in said casing and having a central sleeve, a disk at each end of said chamber, rollers mounted at their ends in said disks and in circular formation in the sleeve.

3. In a wheel-hub, the combination with an axle and a cylindrical casing closed at its end, of a disk mounted in the outer end of the casing and locked to rotate therewith, a cylindrical lubricant-chamber in said casing and locked to rotate therewith, another disk at the inner end of the lubricant-chamber, locked to rotate with the casing, a central sleeve in the lubricant-chamber, rollers disposed between the sleeve and axle and carried by said disks, another disk secured or integral with the axle and a nut screwed into the inner end of the casing and against the last-mentioned disk.

4. In a wheel-hub, the combination with a cylindrical casing closed at its outer end, and made with internal longitudinal grooves, and an axle, of a cylindrical lubricant-chamber in said casing, flanges on said chamber disposed in the grooves in the casing, a central sleeve in said chamber having an oil-duct therein, rollers mounted between said sleeve and axle, a disk integral with said axle and a nut screwed into the inner end of the casing and against the disk to hold the hub on the axle.

In testimony whereof I have signed this specification in the presence of two subscribing witnesses.

EDMUND BRUEGGEMANN.

Witnesses:
ANDREW MOELLER,
CHARLES G. BANG.